Sept. 15, 1942.    F. S. DENNEEN ET AL    2,295,777
METHOD OF CONTROLLING HEATING AND QUENCHING
Filed May 27, 1940

INVENTORS

Patented Sept. 15, 1942

2,295,777

UNITED STATES PATENT OFFICE 2,295,777

METHOD OF CONTROLLING HEATING AND QUENCHING

Francis S. Denneen, Cleveland, and William C. Dunn, Shaker Heights, Ohio, assignors to The Ohio Crankshaft Company, Cleveland, Ohio, a corporation of Ohio Application May 27, 1940, Serial No. 337,426

2 Claims. (Cl. 148—21)

The present application as a continuation in part of our co-pending application, Serial No. 54,388, filed December 14, 1935, and entitled "Heat treatment of shafts and the like," is directed to a method of hardening gears, splined shafts and the like which provides hard wearing surfaces for the gear teeth, splines or other projecting members while maintaining other parts of the article relatively soft and ductile. It is concerned mainly with heating by means of induced currents. Gear teeth or splines usually require a treatment somewhat different from that of a plain shaft or other article due to the current, excepting when very high frequencies are used, tending to follow the root sections heating these first and later heating the projecting parts, such as the teeth, by conduction of heat from these root sections. There is thus a tendency for the root sections to be heated to a greater degree than the tops of the teeth or projections, and as a result, when quenching occurs, these sections will be hardened to a degree, at least as great as that of the projections unless means is employed to prevent quenching in these sections at a rate high enough to produce such hardness.

Accordingly the principal object of this invention is to provide means for preventing rapid quenching in the root sections of such toothed articles as gears and splined shafts. Another object is to provide a method whereby a gear or similar article can be produced with a high degree of hardness in the wearing surfaces of the teeth while a high degree of ductility and resistance to fatigue is provided in the root portions.

With these and other objects in view said invention then consists of the means and method hereinafter set forth. It will be understood that the phraseology employed is for the purpose of description and not for limitation, and that the invention may appear in many embodiments differing in detail from the following disclosure but within the scope of the claims herein.

The annexed drawing and following description set forth in detail certain mechanism embodying the invention, such disclosed means, however, constituting but one of the various forms in which the principle of our invention may be used.

Figure 1:
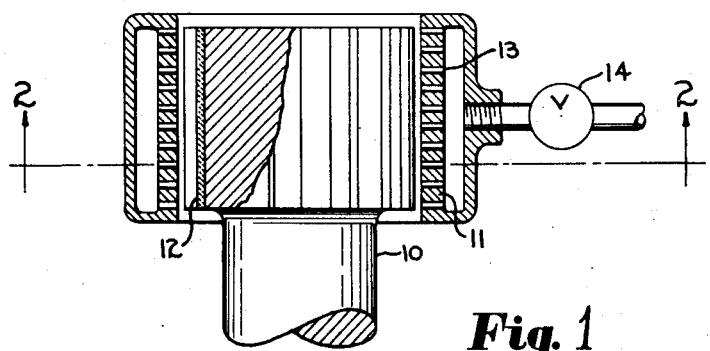
Figure 1 is a section on line 1—1 of Figure 2 showing in fragmentary form a part of a splined shaft being hardened.
Figure 2:
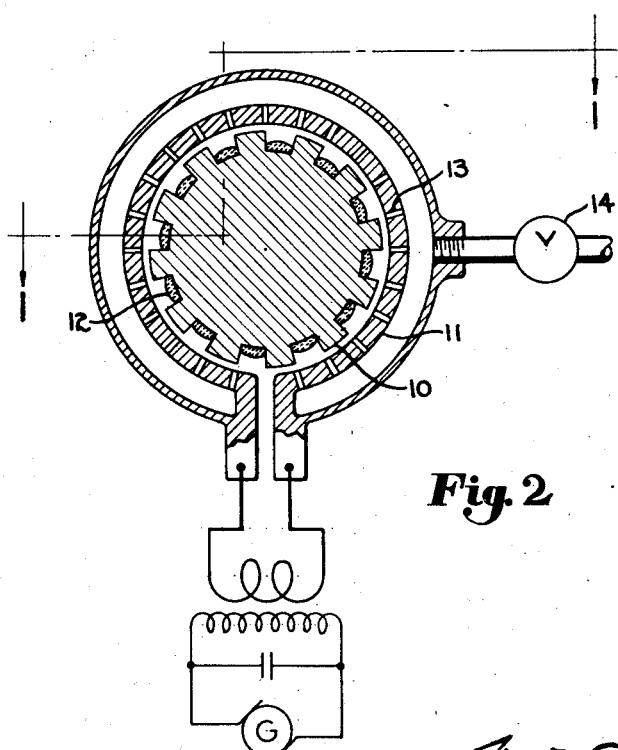
Figure 2 is a section on line 2—2 of Figure 1.

In a cylindrical article such as 10 having teeth thereon, experiments have established that the greater parts of current induced by a circumferentially disposed conductor, such as 11, flow circumferentially at the roots of the teeth there being but limited flow into the tooth sections. The heat being intense at the roots, a part of this will flow into the outer parts of the teeth, rapidly bringing these outer parts to the critical temperature. As these outer parts must be quenched suddenly to provide a high degree of hardness and as such rapid quenching and hardness at the root will produce brittleness a slower rate of quenching at the root is required. For the purpose of retarding the quench at the root, the heat insulating fillers 12 are inserted before heating and, although the root section reaches a high temperature, these sections do not become extremely hard as the quenching is materially retarded by the necessity of the heat at the root having to travel out thru the tops of the teeth to be absorbed by the quench, this travel requiring sufficient time to provide an opportunity for the chemical structure of the metal at the root to change during cooling thus leaving it substantially as soft as the core or inner metal while the top of the tooth and the sides adjacent to the top become very hard. It will be understood that the metal employed for the shaft 10 must be such as can be hardened by heating and quenching.

It will be understood that the fillers 12 will assume various forms depending on the type and size of teeth being hardened and on the limitations of hardness desired. Also, these fillers may be made of various kinds of materials possessing correct heat insulating properties without danger of failure due to the required sudden changes in temperature. The flow of quenching fluid thru orifices 13 in the inner wall of the conductor is regulated by valve means such as 14. To obtain highly efficient quenching the orifices 13 are so disposed as to direct the flow of quenching fluid onto and along those surfaces of the projections which it is particularly desired to possess a high degree of hardness. To prevent brittleness, quenching usually is interrupted soon enough to leave sufficient residual heat in the shielded root section to permit a part of this heat to flow into the projections to temper the highly hardened surface zones.

In applying this invention to articles other than those having teeth or similar projections, the hardness of any selected area is readily regulated by placing a shield, usually of relatively thin section, in contact with the area whose hardness it is desired to control, the shield being substantially of the form of the area desired. The surface zone is then heated by bringing a conductor of high frequency current in spaced relationship with the surface, and usually into close proximity with the shield, to heat the surface zone including that part of the zone lying beneath the shield. Quenching fluid is then applied to the entire area, the shield preventing the fluid from coming into direct contact with that part of the surface of the article covered by the shield. In some cases a metallic shield is used, preferably with a heat insulating layer under at least part of the shield to prevent the shield from contacting with the surface of the article excepting at selected points. By having the shield formed to carry part of the induced current, this current will flow in the shield to heat it instead of heating the article, and in quenching, the shield and the parts of the article surrounding the shield will be quenched while the part or parts under the shield will have been protected from any sudden cooling due to the contacting of the quenching as well as from most of the prior heating. Such metallic shield is usually made of heat resisting metal or from metal not injured by repeated heating and quenching which makes it possible to use one shield a number of times.

Other modes of applying the principle of our invention may be employed instead of the one explained, change being made as regards the mechanism herein disclosed, provided the means or method stated by any of the following claims or the equivalent of such stated means or method be employed.

We therefore particularly point out and distinctly claim as our invention:

1. A method of regulating hardness in surface zones of a toothed article, the article being adapted to be hardened by heating and quenching, comprising inserting a shield between adjacent teeth of the article, the shield being of varying thickness, placing a conductor in spaced relationship with top portions of the teeth, passing high frequency current thru the conductor to induce heating current in a peripherally extending zone at root portions of the teeth and in lower flank parts of the teeth, permitting heat to drift from the root portions into top and upper flank portions to raise said top and upper flank portions to hardening temperature, and then projecting streams of quenching fluid onto and along the flanks of the teeth to quench said flanks more rapidly than other parts of said teeth, the aforesaid shield being disposed to prevent the streams from impinging against the roots of the teeth, the shield thus retarding the cooling rate and thereby reducing hardness in the said root portions.

2. A method of regulating hardness in surface zones of a toothed article, the article being adapted to be hardened by heating and quenching, comprising inserting an insulating shield between adjacent teeth and in substantial contact with a root portion between the teeth, placing a current conducting shield between the teeth to serve as a cover for the insulating shield, extending the said conducting shield to contact with parts of the root portion beyond the sides of the insulating shield to serve as a shunt to carry a part of the current which would flow from tooth to tooth in the said root portion between the teeth, placing a conductor in spaced relationship with top portions of the teeth, passing high frequency current thru the conductor to induce heating current in a peripherally extending zone at root portions of the teeth and in lower flank portions of the teeth, the aforesaid current conducting shield carrying a part of the induced current which would otherwise flow in the root portion between the teeth, permitting heat to drift from the root portions into top and upper flank portions to raise said top and upper flank portions to hardening temperature, and then projecting streams of quenching fluid onto the flanks of the teeth to quench said flanks more rapidly than other parts of the teeth, the aforesaid shields being disposed to prevent the streams from impinging against the root portions between the teeth, and shield thus retarding the cooling rate of the said root portion.

FRANCIS S. DENNEEN.
WILLIAM C. DUNN.